(12) United States Patent
Kikkawa et al.

(10) Patent No.: US 7,369,201 B1
(45) Date of Patent: May 6, 2008

(54) LIQUID-CRYSTAL DISPLAY HAVING LIQUID-CRYSTAL LAYER ORIENTED TO BEND ALIGNMENT

(75) Inventors: Hironori Kikkawa, Tokyo (JP); Takahiko Watanabe, Tokyo (JP)

(73) Assignee: NEC LCD Technologies, Ltd., Kawasaki, Kanagawa (JP)

( * ) Notice: Subject to any disclaimer, the term of this patent is extended or adjusted under 35 U.S.C. 154(b) by 0 days.

(21) Appl. No.: 09/527,529

(22) Filed: Mar. 16, 2000

(30) Foreign Application Priority Data

Mar. 16, 1999 (JP) ............................ 11-069605

(51) Int. Cl.
*G02F 1/1335* (2006.01)
*G02F 1/133* (2006.01)

(52) U.S. Cl. .................... 349/117; 349/33; 349/106

(58) Field of Classification Search ............ 349/33–36, 349/117–119, 106
See application file for complete search history.

(56) References Cited

U.S. PATENT DOCUMENTS

| 5,107,356 | A | * | 4/1992 | Castleberry | 349/119 |
| 5,541,753 | A | * | 7/1996 | Raynes et al. | 349/200 |
| 5,774,197 | A | * | 6/1998 | Nakamura | 349/117 |
| 6,115,014 | A | * | 9/2000 | Aoki et al. | 345/88 |

FOREIGN PATENT DOCUMENTS

| JP | 6-75116 | 3/1994 |
| JP | 6-294962 | 10/1994 |
| JP | 8-262400 | 10/1996 |
| JP | 10-197862 | 7/1998 |

OTHER PUBLICATIONS

Portions of Publication—"Society for Information Display—International Symposium—Digest of Technical Papers—vol. XXV," San Jose McEnery Convention Center, San Jose, CA, Jun. 14-16, 1994, Title Page, Table of Contents pp. iii-xi, and pp. 927-930.
Korean Office Action dated Nov. 16, 2001, with partial English translation.

* cited by examiner

*Primary Examiner*—Dung T. Nguyen
(74) *Attorney, Agent, or Firm*—McGinn IP Law Group, PLLC

(57) ABSTRACT

A liquid-crystal display suitable for the optically compensated birefringence (OCB) display mode is used so as to simplify the voltage setting relating to display of each color by setting as follows. A liquid-crystal layer is oriented to bend alignment between a pair of substrates. A phase compensation plate is set for compensating a phase of the liquid-crystal layer outside of each of the substrates. And a retardation between the liquid-crystal and the phase compensation plates is set to a value ½ or less of the minimum wavelength of the light relating to display.

11 Claims, 9 Drawing Sheets

FIG.3

| | SAMPLE S1 | SAMPLE S2 | SAMPLE S3 |
|---|---|---|---|
| BIREFRINGENT INDEX OF LIQUID CRYSTAL $\triangle n$ | 0.11 | 0.13 | 0.16 |
| PERMITTIVITY ANISOTROPY OF LIQUID CRYSTAL $\triangle \epsilon$ | 4 | 4.1 | 4.1 |
| PRE-TILT | 5 DEGREES | 5 DEGREES | 5 DEGREES |
| k11 | 10.2 | 10.3 | 10.5 |
| k22 | 7.0 | 7.0 | 7.5 |
| k33 | 17.0 | 17.0 | 17.2 |
| INTERVAL BETWEEN SUBSTRATES | 5.5 μm | 5.5 μm | 5.5 μm |
| PHASE COMPENSATION PLATE Rf (VALUE AT FRONT) | 50nm FOR ONE PLATE | 50nm FOR ONE PLATE | 50nm FOR ONE PLATE |
| APPLIED VOLTAGE UNDER BLACK DISPLAY | 8V | 9V | 10V |

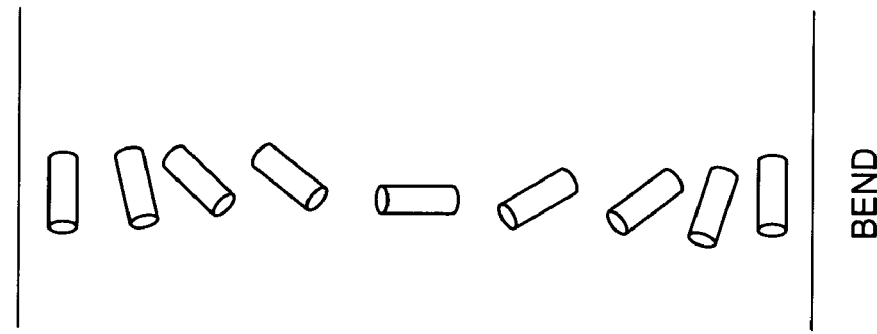
FIG.4A SPLAY
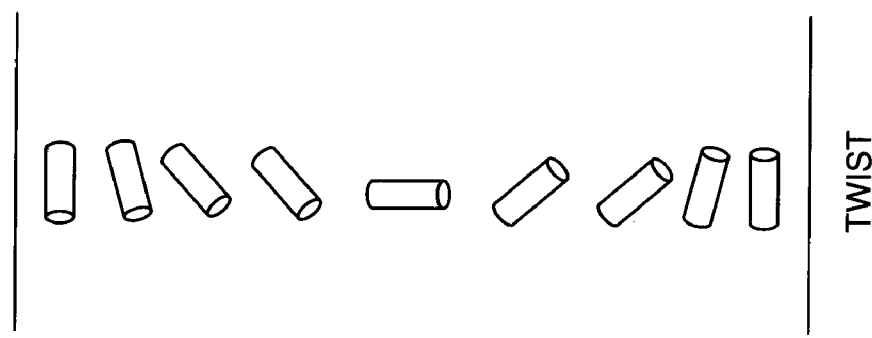
FIG.4B TWIST
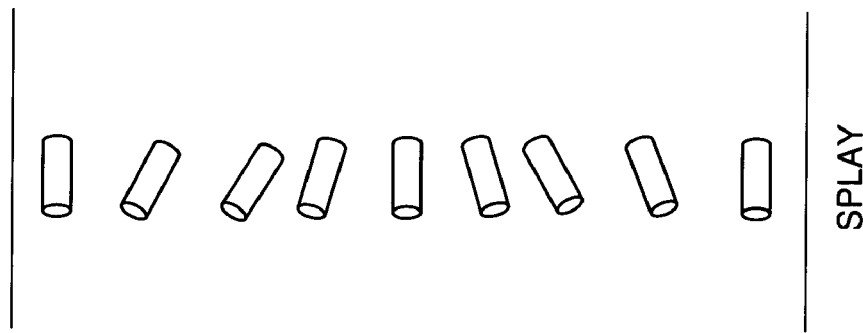
FIG.4C BEND

FIG.6

- RF1
- RF2
- RF3
- RF4
- RF5
- LC5
- LC4
- LC3
- LC2
- LC1
- LC1
- LC2
- LC3
- LC4
- LC5
- RF5
- RF4
- RF3
- RF2
- RF1 nlcx··· x-DIRECTIONAL REFRACTIVE INDEX OF LC5
nlcy··· Y-DIRECTIONAL REFRACTIVE INDEX OF LC5
nrfx··· x-DIRECTIONAL REFRACTIVE INDEX OF RF5
nrfy··· y-DIRECTIONAL REFRACTIVE INDEX OF RF5

LIQUID-CRYSTAL DISPLAY HAVING LIQUID-CRYSTAL LAYER ORIENTED TO BEND ALIGNMENT

BACKGROUND OF THE INVENTION

1. Field of the Invention

The present invention relates to a liquid-crystal display suitable for a wide viewing angle, particularly to a liquid-crystal display having a liquid-crystal layer oriented to bend alignment and suitable for an optically compensated birefringence (OCB) mode.

2. Description of the Prior Art

A liquid-crystal display is rapidly spread as a display unit substituted for a CRT because it is thin and a display area can be relatively easily increased.

A liquid-crystal operation mode includes a twisted nematic mode (hereafter referred to as TN mode). The TN mode is realized by rotating the direction of the molecular axis of liquid-crystal molecules (hereafter referred to as director) by approx. 90° between substrates and twist-orienting the liquid-crystal molecules. When applying an electric field vertically to a substrate, a director vertically rotates to display an object.

However, the TN mode has a problem that a viewing angle is narrow. Therefore, it is impossible to visually confirm a displayed object from a diagonal direction. Moreover, when a screen area is increased, an object is not properly displayed because appearance of the object differs at the center and an end of a screen when viewing the screen from a certain viewpoint in a diagonal direction.

To solve the above problem, a viewing angle is expanded by adding a phase compensation plate to a TN-mode liquid-crystal panel in the case of the official gazette of Japanese Patent Laid-Open No. 75116/1994. In the case of this art, however, it is difficult to completely compensate a twisted structure intrinsic to the TN mode and therefore, the problem is not fundamentally solved yet.

Therefore, OCB (optically compensated birefringence) is noticed as means for improving a viewing angle.

OCB is realized by forming a liquid-crystal layer oriented to bend an alignment between two substrates and moreover, setting a phase compensation plate for compensating a phase of the liquid-crystal layer outside of each substrate as shown in FIG. 1 to be mentioned later.

A liquid-crystal layer oriented to a bend alignment represents that liquid-crystal molecules held between two substrates show a symmetric orientation from the center between the substrates as shown in FIG. 4C to be mentioned later. Moreover, directors of liquid-crystal molecules are changed by applying a voltage between the substrates.

Moreover, a phase compensation plate having a negative birefringent property is known which is disclosed in the official gazette of Japanese Patent Laid-Open No. 294962/1994. Furthermore, a biaxial phase compensation plate is reported by Kuo et al. in an article titled "Improvement of Gray-Scale Performance of Optically Compensated Birefringence (OCB) Display Mode for AMLCDs" on pp. 927 to 930 of SID'94Digest issued on Jun. 14, 1994. Furthermore, a hybrid-arranged phase compensation plate having a negative birefringent property is known which is disclosed in the official gazette of Japanese Patent Laid-Open No. 197862/1998.

In the case of OCB, when changing directors of liquid-crystal molecules by applying a certain voltage, two types of retardations such as retardation Rlc and phase-compensation-plate retardation Rrf are obtained. When retardation R of the whole OCB obtained by integrating these two types of retardations Rlc and Rrf is equal to zero or a multiple of a wavelength, black is displayed. In the case of a voltage other than the above, white or halftone is displayed.

A liquid-crystal layer oriented to the bend alignment does not include any twist differently from the TN mode. Therefore, phase compensation is easily made and wide-field display is realized.

However, the above conventional OCB has the following problem.

That is, in the official gazette of Japanese Patent Laid-Open No. 197862/1998, the product between a birefringent index Δn of a liquid-crystal material in a cell and a thickness d of the cell is set to a value between 790 nm and 1190 nm. This value is a value when every liquid-crystal molecule is parallel with a substrate.

When a bend-alignment state is realized, a liquid-crystal molecule at the central portion rises. Therefore, the retardation Rlc of a liquid-crystal layer decreases to about ⅓ to ½ of the above value (790 to 1190 nm).

The value of the retardation Rrf of a phase compensation plate is not specified. However, when considering that black display is obtained at a high voltage of approx. 8 V and referring to the value of retardation of a currently-marketed hybrid-aligned negative birefringent phase compensation plate, the retardation Rrf is equal to approx. 100 nm.

In this case, the major axis of the birefringent index of the phase compensation plate is orthogonal to the major axis of the birefringent index of a liquid-crystal molecule. Therefore, the retardation R of the whole OCB when displaying white becomes approx. 250 to 300 nm. A transmitted-light intensity I of a liquid-crystal display using the birefringent property can be expressed by the following equation (1), $$I = A \cdot (\sin(2\theta))^2 \cdot (\sin(R \cdot \pi/\lambda))^2 \tag{1}$$

where A denotes a proportionality factor, θ denotes an angle formed between polarization axis and birefringent-index major axis of a polarizing plate, and λ denotes a wavelength of light. From equation (1), it is found that light having λ of 500 to 600 nm has a high transmittance when setting the retardation R to 250 to 300 nm. That is, setting is made so that light having a green wavelength band is well transmitted.

Since a human eye has a high visibility in green wavelength band, brightness rises in the case of the conventional OCB disclosed in the official gazette of Japanese Patent Laid-Open No. 197862/1998.

In the case of the above OCB, however, the following trouble occurs particularly when performing color display.

Transmittances of red, green, and blue lights when using OCB are shown in FIG. 10 to be mentioned later. That is, transmittances of green and red lights monotonously decrease as an applied voltage rises. However, transmittance of blue light first increases, peaks at 2.6 V, and thereafter decreases. Therefore, to display gradations, a voltage of 2 to 10 V is applied to red and green lights. However, in the case of blue light, an applied voltage of 2.6 to 10 V must be set differently from the case of green and red lights.

In the case of a general liquid-crystal display, when applying a voltage to liquid crystal, it is preferable to apply the same voltage to red, green, and blue. This is because, if a different applied voltage is set to each color, the number of electronic components increases to obtain a desired voltage.

Therefore, to set a proper voltage, the number of electronic component increases, the manufacturing cost increases, and moreover a circuit substrate increases in size, and thus it is prevented to make a compact liquid-crystal display device.

SUMMARY OF THE INVENTION

Therefore, it is an object of the present invention to provide a liquid-crystal display making it possible to decrease the manufacturing cost and the size and suitable for the OCB display mode.

In the case of a liquid-crystal display of the present invention, a liquid-crystal layer oriented to bend alignment is set between a pair of substrates and a phase compensation plate for compensating a phase is set outside of each substrate and the retardation of the light passing through the liquid-crystal layer and the phase compensation plate is set so as to be ½ or less of the minimum wavelength of the light relating to display.

Moreover, it is possible to set a birefringent index of a liquid-crystal molecule in a liquid-crystal layer to 0.16 or less.

Furthermore, it is possible to set the minimum wavelength of the light relating to display in accordance with a minimum-wavelength color among colors relating to color display.

Furthermore, it is possible to set the minimum wavelength of light in accordance with blue color.

Furthermore, it is possible to set the minimum wavelength of the light relating to display to 380 to 488 nm.

Therefore, in the case of a liquid-crystal display of the present invention, it is possible to set a liquid-crystal layer oriented to bend alignment between a pair of substrates, set a phase compensation plate for compensating a phase of a liquid-crystal layer outside of each substrate, and set the retardation between the liquid-crystal layer and the phase compensation plate to a value ½ or less of the minimum wavelength of the light relating to display so as to simplify voltage setting relating to display of each color.

BRIEF DESCRIPTION OF THE DRAWINGS

FIG. 3 is a table showing conditions for manufacturing the liquid-crystal display shown in FIG. 1;

FIGS. 4A, 4B, and 4C show orientation states of liquid-crystal molecules of the liquid-crystal display shown in FIG. 1, which are schematic views showing splay orientation, twist orientation, and bend orientation in order;

FIG. 6 is a schematic view showing birefringent properties of the liquid-crystal layer and phase compensation plate shown in FIG. 1;

DETAILED DESCRIPTION OF THE PREFERRED EMBODIMENTS

Figure 1:
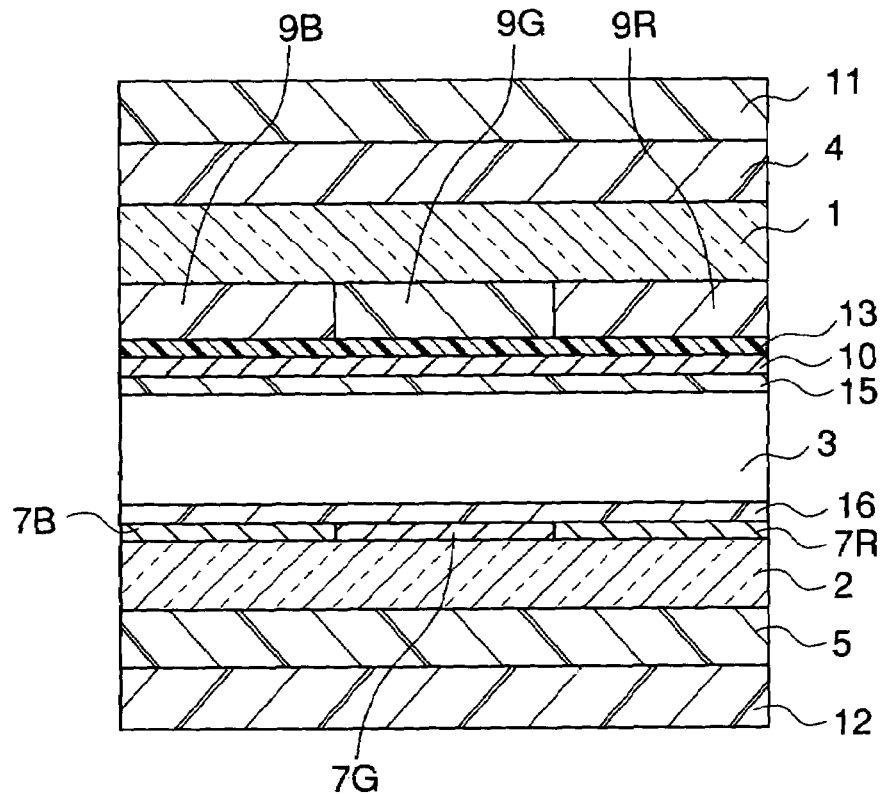
FIG. 1 is a sectional view showing an embodiment of a liquid-crystal display of the present invention.

As shown in FIG. 1, a liquid-crystal display is provided with a pair of substrates 1 and 2 faced to each other. Red, green, and blue color filters 9R, 9G, and 9B are formed on the substrate 1. An overcoat layer 13, a common electrode 10, and a liquid-crystal orientation layer 15 are formed on the color filters 9R, 9G, and 9B.

Pixel electrodes 7R, 7G, and 7B are formed on the substrate 2. A liquid-crystal orientation layer 16 is formed on the pixel electrodes 7R, 7G, and 7B.

The substrates 1 and 2 are combined so that their liquid-crystal orientation layers 15 and 16 are faced to each other. A liquid-crystal layer 3 is formed between the substrates 1 and 2. Hybrid-aligned phase compensation plates 4 and 5 respectively having a negative birefringent property and polarizing plates 11 and 12 are formed outside of the substrates 1 and 2.

In this embodiment, the pixel electrodes 7R, 7G, and 7B are formed to respectively apply a voltage to each color pixels. Moreover, in the case of a liquid-crystal display having a large display, active matrix driving method can be employed by using active devices such as thin-film transistors.

This type of the liquid-crystal display is manufactured as described below.

First, color filters 9R, 9G, and 9B are formed on a glass substrate 1 through three times of the photolithography steps. In this case, patterning is performed with a material obtained by dispersing red, green, and blue pigments into a polyimide-based photosensitive polymer.

The red color filter 9R uses a filter having the peak of transmittance in 640-nm-wavelength light. The blue color filter 9G uses a filter having the peak of transmittance in 430-nm-wavelength light in order to improve the light using efficiency together with the peak of the light emitted from a fluorescent tube used as a light source.

When considering a light source and white balance, it is possible to change each peak wavelength. For example, it is said that a wavelength range of the light judged as blue by a person is 380 to 488 nm, it is preferable to set blue in the above range.

Then, the overcoat layer 13 is formed on the color filters 9R, 9G, and 9B by spin-coating a polyimide-based transparent polymer and thereafter heating the polymer.

The overcoat layer 13 is used to flatten the irregularity of the color filters 9R, 9G, and 9B and improve the orientation of liquid-crystal molecules. A material such as polyimide which is not deformed or quality-changed even at 200° C. or higher is selected for the color filters 9R, 9G, and 9B and the overcoat layer 13.

Then, an ITO (Indium-Tin-Oxide) film is formed on the overcoat layer 13 by using a sputtering method and which is patterned to form a common electrode 10.

Then, a liquid-crystal orientation layer 15 is formed by applying polyimide up to a thickness of approx. 50 nm through the use of a printing method, and then subjected to a heat treatment.

Moreover, pixel electrodes 7R, 7G, and 7G are formed on the substrate 2 by forming the ITO film and then patterning it similarly to the case of the substrate 1. Then, a liquid-crystal orientation layer 16 is formed by applying polyimide up to a thickness of approx. 50 nm through the use of a printing method, and then subjected to a heat treatment.

Figure 2:
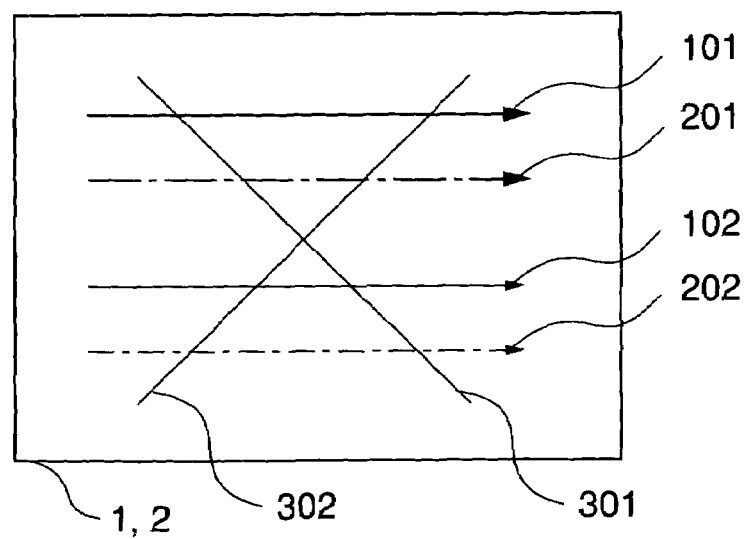
FIG. 2 is a top view for explaining the rubbing of substrates shown in FIG. 1.

Then, rubbing is applied to the substrates 1 and 2 in the directions shown by arrows 101 and 102 in FIG. 2. Polymer beads as spacer beads, each having diameter corresponding to a gap between the substrates 1 and 2, are sprayed on the entire surfaces of either one of the substrates. Then the both substrates 1 and 2 are arranged to be opposed to each other so that rubbing directions thereof are directed to the same direction.

The substrates 1 and 2 are sandwiched between the hybrid-aligned phase compensation plates 4 and 5 respectively having a negative birefringent property. Moreover, as shown in FIG. 2, tilt directions 201 and 202 of birefringent properties of the phase compensation plates 4 and 5 are made the same as the arrows 101 and 102 showing rubbing directions.

The polarizing plates 11 and 12 are bonded onto the phase compensation plates 4 and 5, respectively. The polarization axis of one of the polarizing plates 4 and 5 is set in a direction 301 at an angle of 45° from a liquid-crystal orientation direction. The other of the polarizing plates 4 and 5 is set in a direction 302 perpendicular to the direction 301.

Three samples S1, S2, and S3 of the liquid-crystal display thus manufactured are prepared and relations between physical-property parameters of liquid crystal on one hand and an interval between the substrates 1 and 2 on the other when using the samples are shown in FIG. 3.

The gap between the substrates 1 and 2 is set to 5.5 µm. This is because a birefringent index of liquid crystal currently stably operating at room temperature is equal to approx. 0.16 or less and advantages of the present invention to be described later are effectively shown. Physical-property parameters are selected which are almost the same except a birefringent index Δn of liquid crystal so that advantages of the present invention can be easily understood. In this connection, the lower limit of a birefringent index of liquid crystal stably operating at room temperature is equal to approx. 0.05 at present.

Then, operations of the liquid-crystal display of this embodiment are described below.

Because OCB closely relates to an orientation state and an electrooptical characteristic of a liquid-crystal molecule differently from the TN mode, an orientation state of liquid-crystal molecules is first described below.

By applying a voltage between the pixel electrodes 7R, 7G, and 7B on one hand and the common electrode 10 on the other in FIG. 1, directions of a molecular axis of a liquid-crystal molecule, that is, directors are changed. In the case of the liquid-crystal layer 3 formed as described above, orientation states of liquid-crystal molecules include three states such as splay, twist, and bend states as shown in FIGS. 4A to 4C. State energy of each orientation state depends on the magnitude of a voltage to be applied and the liquid-crystal layer 3 tends to keep lower state energy.

Figure 5:
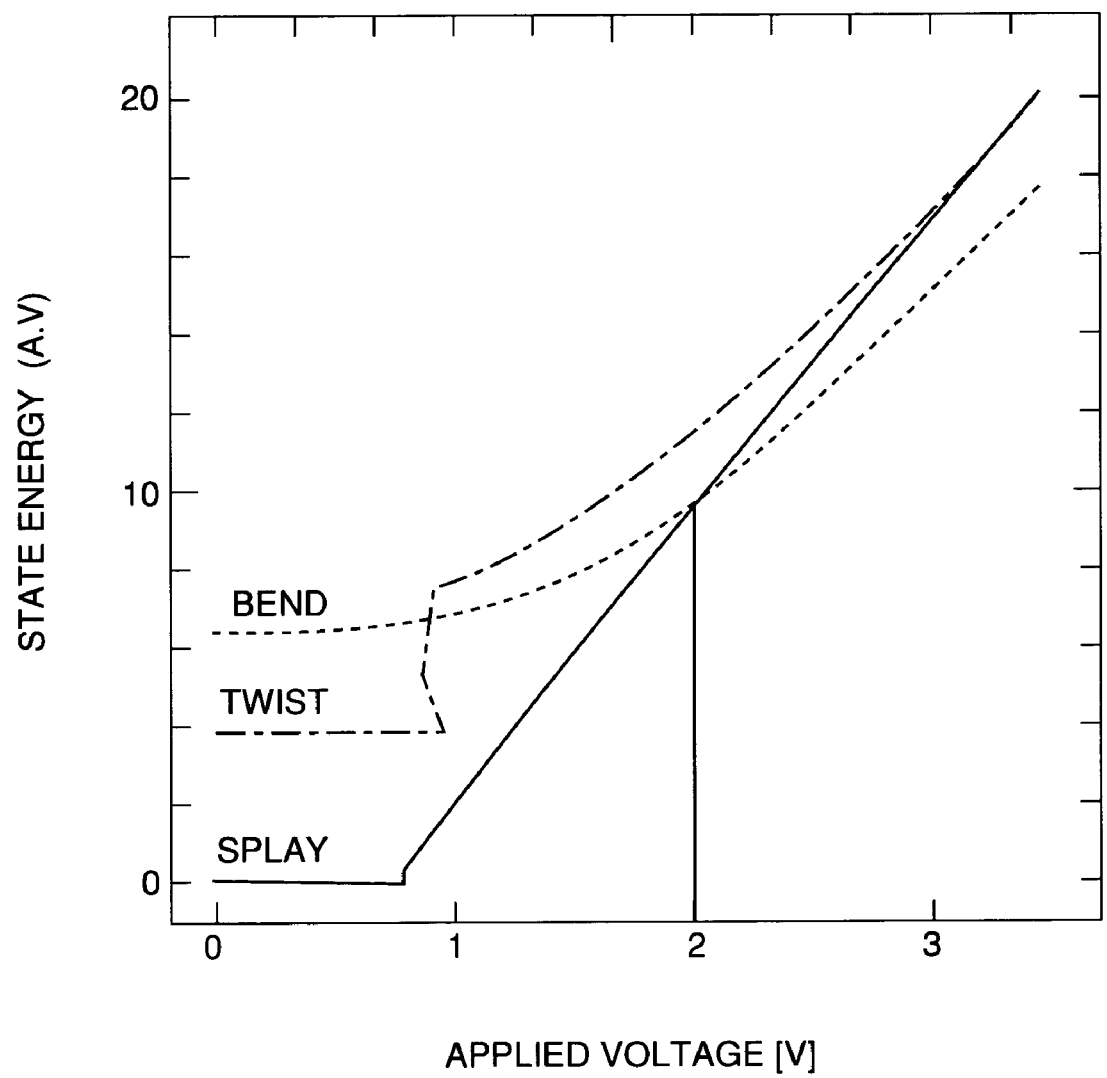
FIG. 5 is a characteristic diagram showing calculated values of state energies of the orientation states shown in FIG. 4.

FIG. 5 shows calculated values of state energies. In the case of three samples S1, S2, and S3 shown in FIG. 3, the state energy of the bend orientation state becomes lower than those of other states when an applied voltage is 2 V or higher. This is the most stable state. In the case of OCB, it is necessary that the liquid-crystal layer 3 is kept in the bend orientation state. Therefore, the samples S1, S2, and S3 can be used in an area having a voltage of 2 V or higher.

Then, electrooptical characteristics of OCB are described below.

OCB is a liquid-crystal mode for displaying an object by controlling the birefringent property. It is assumed that the retardation of the liquid-crystal layer 3 obtained by applying a certain voltage and changing directors of liquid-crystal molecules is Rlc and the retardation between phase compensation plates 4 and 5 is Rrf. When assuming the retardation of the whole OCB obtained by integrating these two retardations Rlc and Rrf as R, a transmittance intensity I is shown by the above equation (1).

That is, when the retardation R is equal to zero or a multiple of a wavelength, black is displayed. In the case of voltages other than the above certain voltage, white or halftone is displayed.

FIG. 6 shows birefringent properties of the liquid-crystal layer 3 and the phase compensation plates 4 and 5. Birefringent properties LC1 to LC5 show birefringent-index ellipsoids of liquid-crystal molecules and birefringent properties RF1 to RF5 show birefringent-index ellipsoids of the phase compensation plates 4 and 5.

Hybrid-aligned negative birefringent properties correspond to birefringent properties of the liquid-crystal layer 3 when black is displayed. The birefringent property LC1 of the liquid-crystal layer 3 correspond to the birefringent property RF1 of the phase compensation plates 4 and 5 and the birefringent properties LC1 and RF1 are compensated each other. Similarly, LC2 and RF2, LC3 and RF3, LC4 and RF4, and LC5 and RF5 are respectively compensated each other.

Figure 7A:
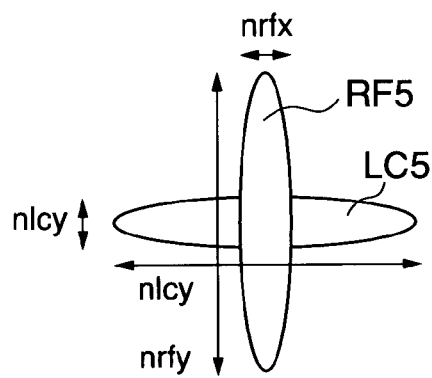
FIGS. 7A and 7B are schematic views of birefringent properties of the liquid-crystal layer and phase compensation plate shown in FIG. 1 viewed from the front and a diagonal direction.

For example, when observing the birefringent properties LC5 and RF5 from the front, the both properties are orthogonal to each other as shown in FIG. 7A. When integrating birefringent indexes of the both properties, an x-directional refractive index nlcx of the birefringent property LC5 becomes equal to a y-directional refractive index nrfy of the birefringent property RF5 and moreover, a y-directional refractive index nlcy of the birefringent property CL5 becomes equal to an x-directional refractive index nrfx of the birefringent property RF5. Therefore, the retardation R shown by the following equation (2) becomes zero, $$R=[(nlcx+nrfx)/2-(nlcy+nrfy)/2]\cdot d \qquad (2)$$

where d denotes a thickness of a liquid-crystal layer.

Figure 7B:
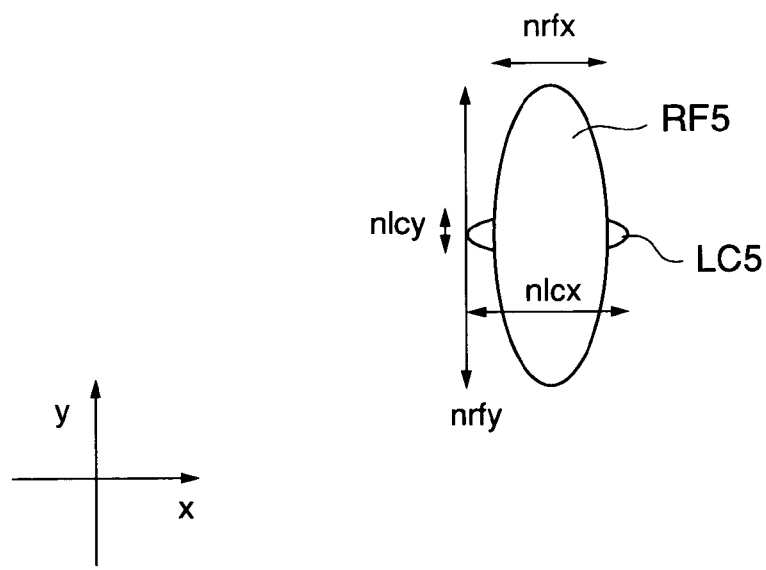

When viewing the birefringent property LC5 and birefringent property RF5 from a diagonal direction along the rubbing direction, the x-directional refractive index nlcx of the birefringent property LC5 decreases compared to the case of observing the LC5 and RF5 from the front as shown in FIG. 7B. However, the x-directional refractive index nrfx of the birefringent property RF5 increases by a value equivalent to the decrease of the x-directional refractive index nlcx of the birefringent property LC5 and a value obtained by adding the both indexes nrfx and nlcx is not changed. Therefore, the retardation R becomes zero.

Similarly, LC2 and RF2, ..., and LC5 and RF5 are respectively compensated each other. Therefore, even when observing OCB from a diagonal direction, the whole retardation R is equal to zero, black can be displayed, and a wide viewing angle is obtained.

Figure 8:
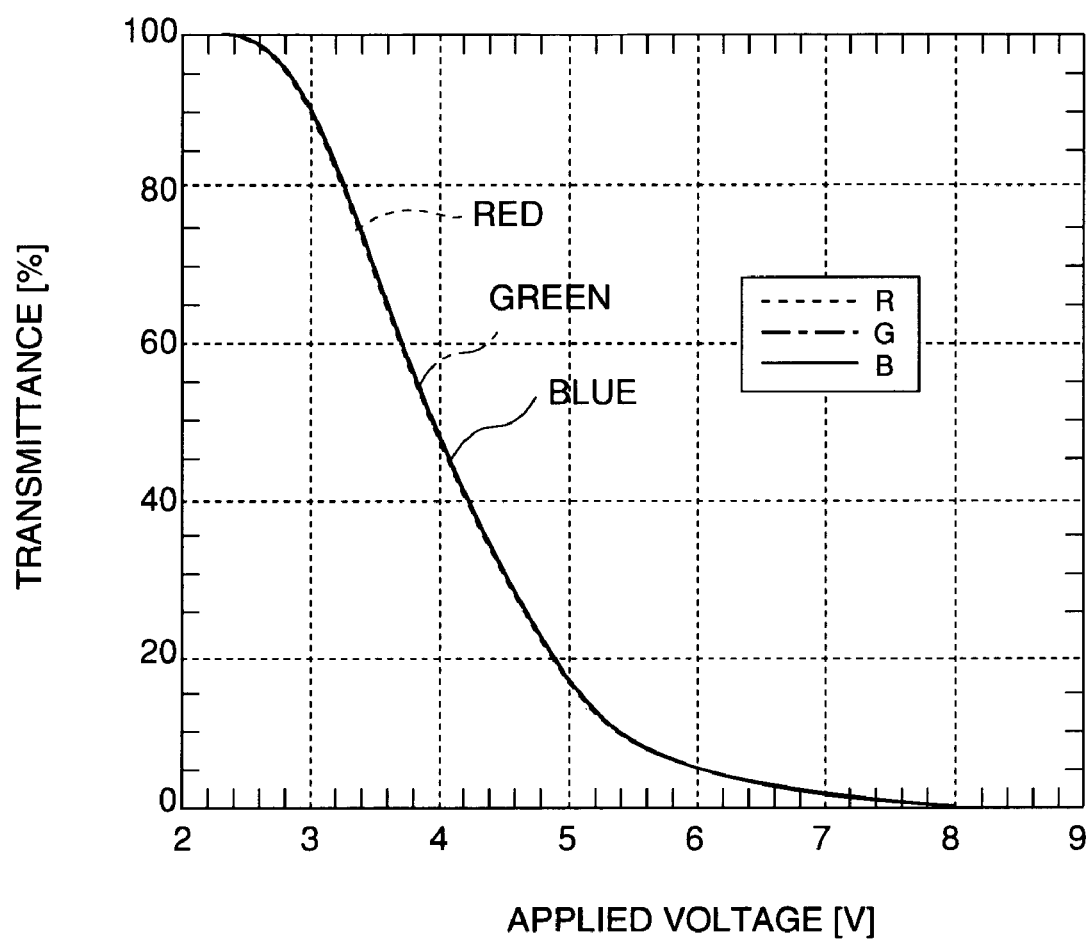
FIG. 8 is a characteristic diagram showing an electrooptical characteristic of the sample S1 shown in FIG. 3.
Figure 9:
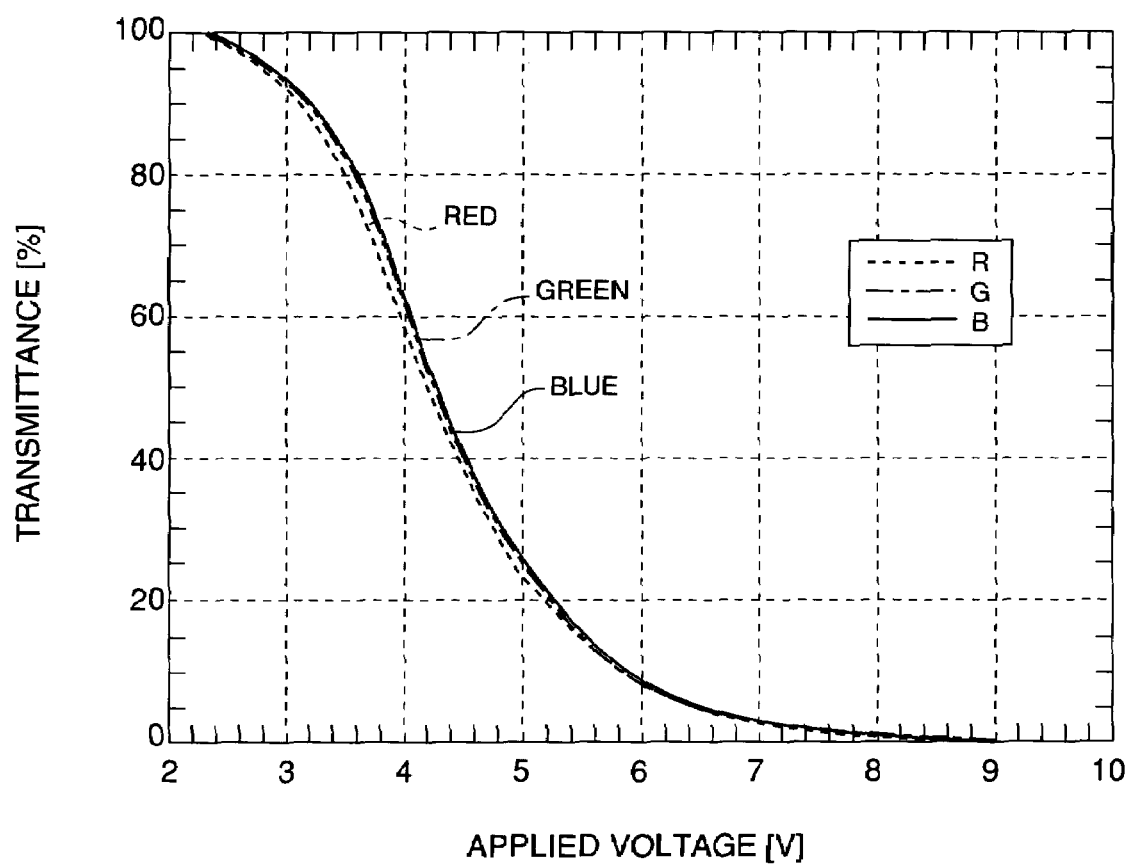
FIG. 9 is a characteristic diagram showing an electrooptical characteristic of the sample S2 shown in FIG. 3.
Figure 10:
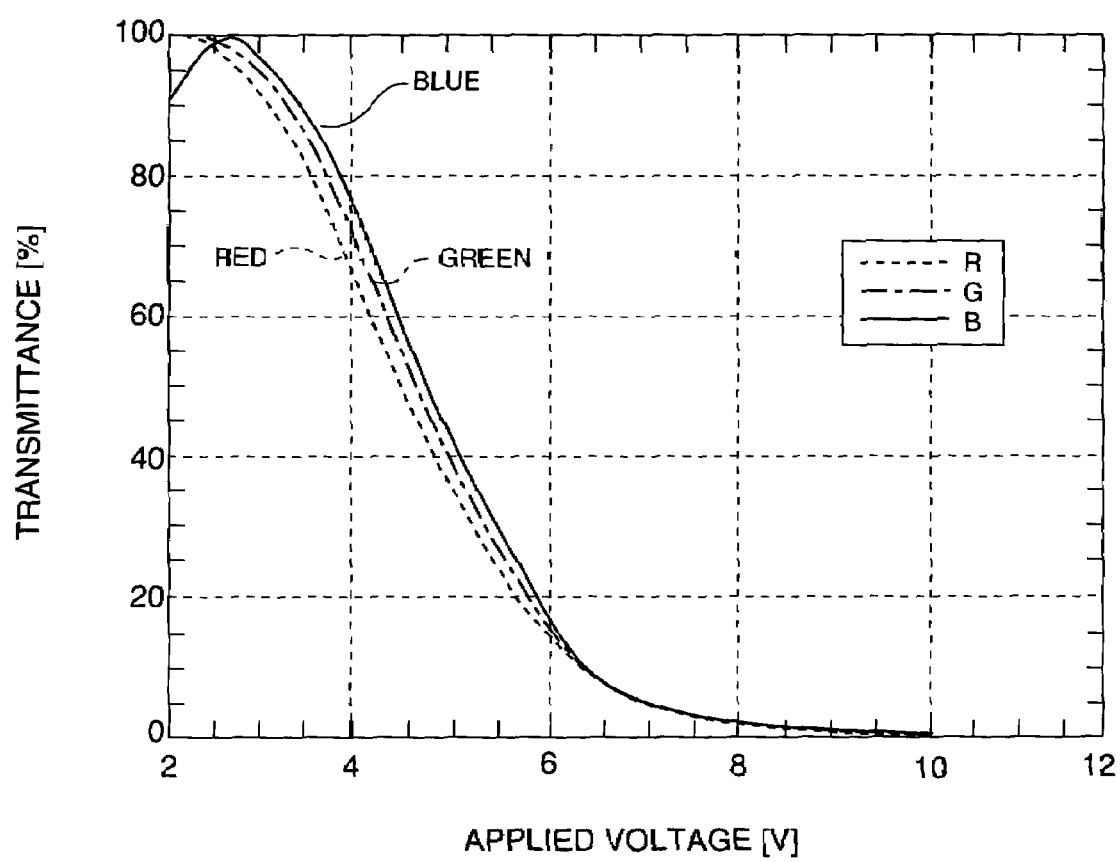
FIG. 10 is a characteristic diagram showing an electrooptical characteristic of the sample S3 shown in FIG. 3.

As shown in FIGS. 8 and 9, in the case of the electrooptical characteristic of the samples S1 and S2, transmittances of red, green, and blue monotonously decrease in a voltage range from 2 V up to a voltage Vb1 which is equal to 8 or 9 V at which black display is obtained. However, in the case of the electrooptical characteristic of the sample 3, the transmittance of only blue does not monotonously decrease but it once first increases and then decreases.

As shown in FIGS. 8 and 9, in the case of the electrooptical characteristics of the samples S1 and S2, transmittances of red, green, and blue monotonously decrease in an voltage range from 2 V up to a voltage Vb1 which is equal to 8 or 9 V at which black display is obtained. However, in the case of the electrooptical characteristic of the sample 3, the transmittance of only blue does not monotonously decrease but it once increases and then decreases.

The above phenomenon is caused by the following reason.

A transmitted-light intensity is maximized when the retardation R is equal to ½ of a light wavelength in accordance with the above equation (1). This is because, when incident light receives a birefringent property, its phase is shifted by $\pi$ and thereby, a condition is set that the incident light is directly emitted from an orthogonal polarizing plate.

As a result of observing the whole retardation R of the samples S1, S2, and S3 when applying up to 2 V to Vb1, it is found that the whole retardation R changes in a range between 142 nm and 0 nm in the case of the sample S1. Moreover, it is found that the retardation R changes in a range between 192 nm and 0 nm in the case of the sample S2.

Because transmitted light does not pass through the maximum point of transmitted-light intensity under the above condition, it monotonously decreases. In the case of the sample S3, however, the retardation R changes in a range between 262 nm and 0 nm. Transmitted light passes through a point R=215 nm where the transmitted-light intensity of 430-nm-wavelength light is maximized. Therefore, transmitted light increases up to the point and then, decreases after passing through the point.

Therefore, in the case of the samples S1 and S2 in which the whole retardation R is set to 215 nm or less under operation, transmitted lights of red, green, and blue colors equally decrease to a voltage, it is possible to equalize applied-voltage settings.

In the case of the sample S3, it is impossible to equalize applied-voltage settings because of the above reason when setting an operating voltage to 2 V to Vb1. In this case, the cost increases because it is necessary to increase the number of electronic components for setting applied voltages. However, by setting the operating voltage up to 2.6 V to Vb1, red, green, and blue monotonously decrease and it is possible to equalize applied-voltage settings.

Thus, in the case of this embodiment, it is possible to reduce the manufacturing cost and downsize the display device because of setting the liquid-crystal layer 3 oriented to bend alignment between a pair of substrates 1 and 2, setting the phase compensation plates 4 and 5 for compensating a phase of the liquid-crystal layer 3 outside of the substrates 1 and 2, and setting the retardation R between the liquid-crystal layer 3 and the phase compensation plates 4 and 5 to a value ½ or less of the minimum wavelength of light relating to display so as to simplify the voltage setting for displaying each color.

Moreover, this embodiment uses a filter having a transmittance peak in 430-nm-wavelength light as the blue color filter 9B. Moreover, to perform multiple color display, it is permitted to set the whole retardation R to a value ½ or less of the light having the minimum wavelength among lights using the whole retardation R under operation. In this case, it is possible to equalize applied-voltage setting for any color.

As described above, according to a liquid-crystal display and its manufacturing method of the present invention, it is possible to reduce the manufacturing cost and downsize the display because of setting a liquid-crystal layer oriented to bend alignment between a pair of substrates, setting a phase compensation plate for compensating a phase of the liquid-crystal layer outside of each substrate, and setting retardations of the liquid-crystal layer and the phase compensation plates to a value ½ or less of the minimum wavelength of the light relating to display so as to simplify the voltage setting relating to display of each color.

What is claimed is:

1. A liquid-crystal display comprising:
a liquid-crystal layer provided between a pair of substrates so as to be oriented to bend alignment;
a phase compensation plate provided for an outside of each of the substrates; and
a color filter including a blue color formed on either one of said pair of substrates, a wavelength of a light judged as blue by a person being 380 to 488 nm,
wherein a retardation of a light passing through said liquid-crystal layer and said phase compensation plates is limited to a value ½ or less of a minimum wavelength of said light relating to display, said minimum wavelength of light is set in accordance with the blue color, thereby monotonously decreasing a transmittance of light throughout a transmittance wavelength of the color filter as an applied voltage rises during a predetermined range of driving voltage.

2. The liquid-crystal display according to claim 1, wherein a birefringent index of a liquid-crystal molecule in said liquid-crystal layer is equal to or less than 0.16.

3. The liquid-crystal display of claim 1, further comprising:
a circuit to selectively apply a voltage across said liquid-crystal layer, said voltage being equalized for all colors in said liquid-crystal display, said phase compensation plate allowing a same transmittance of all colors, given the same driving voltage.

4. The liquid-crystal display of claim 1, wherein a birefringent index of a liquid-crystal molecule in said liquid-crystal layer is set so that said liquid-crystal operates in an optically compensated birefringence (OCB) mode.

5. The liquid-crystal display according to claim 1, wherein said minimum wavelength is based on a color having said minimum wavelength among colors relating to color display as determined by color filters comprising said liquid-crystal display and a filter having said minimum wavelength has a transmittance peak at approximately 430 nm wavelength as a blue light.

6. The liquid-crystal display according to claim 5, wherein said blue light color filter comprises a first filter color of said liquid-crystal display, said liquid-crystal display further comprising a second color filter and said second color filter is for a red color having a transmittance peak at approximately 640 nm.

7. A liquid-crystal display comprising:
a first substrate;
a common electrode and a plurality of color filters on said first substrate, said color filters including a plurality of colors, one of said colors having a shortest color wavelength, said shortest wavelength color corresponding to a blue color and falling in a range between 380 nm and 488 nm;
a second substrate supporting a plurality of electrodes;
a liquid-crystal layer provided between said color filters and said second substrate, said liquid-crystal layer having a predetermined range of driving voltages in a bend alignment orientation state; and
a phase compensation plate outside each of said first substrate and said second substrate, wherein said liquid-crystal layer is formed such that, during said predetermined range of driving voltages, a retardation of a light passing through said liquid-crystal layer and said phase compensation plates is limited in range between zero and a value of ½ of said shortest color wavelength, thereby monotonously decreasing a transmittance of light throughout a transmittance wavelength of the color filter as an applied voltage rises.

8. The liquid-crystal display of claim 7, wherein a single power supply is used to selectively apply voltages to said plurality of electrodes.

9. The liquid-crystal display of claim 7, wherein a birefringent index of a liquid-crystal molecule in said liquid-crystal layer is set so that said liquid-crystal operates in an optically compensated birefringence (OCB) mode.

10. The liquid-crystal display according to claim 7, wherein said minimum wavelength is based on a color having said minimum wavelength among colors relating to color display as determined by color filters comprising said liquid-crystal display and a filter having said minimum wavelength has a transmittance peak at approximately 430 nm wavelength as a blue light.

11. The liquid-crystal display according to claim 10, wherein said blue light color filter comprises a first filter color of said liquid-crystal display, said liquid-crystal display further comprising second color filter for a red color having a transmittance peak at approximately 640 nm.

* * * * *